United States Patent
Itoh et al.

(10) Patent No.: US 8,253,356 B2
(45) Date of Patent: Aug. 28, 2012

(54) VEHICLE CONTROL SYSTEM

(75) Inventors: Takeshi Itoh, Nagoya (JP); Akiyoshi Morii, Obu (JP)

(73) Assignees: Toyota Jidosha Kabushiki Kaisha, Toyota-shi (JP); Denso Corporation, Kariya (JP)

( * ) Notice: Subject to any disclaimer, the term of this patent is extended or adjusted under 35 U.S.C. 154(b) by 385 days.

(21) Appl. No.: 12/581,602

(22) Filed: Oct. 19, 2009

(65) Prior Publication Data

US 2010/0097018 A1 Apr. 22, 2010

(30) Foreign Application Priority Data

Oct. 17, 2008 (JP) .................. 2008-268541

(51) Int. Cl.
*H02P 1/00* (2006.01)
(52) U.S. Cl. .......... 318/139; 318/46; 318/430; 180/65.3
(58) Field of Classification Search .......... 318/280–286, 318/139, 430, 432, 727, 812, 46; 180/65.3
See application file for complete search history.

(56) References Cited

U.S. PATENT DOCUMENTS

| | | | |
|---|---|---|---|
| 7,228,926 B2 * | 6/2007 | Takami et al. | 180/65.265 |
| 7,261,670 B2 * | 8/2007 | Endo et al. | 477/3 |
| 7,279,855 B2 * | 10/2007 | Tahara et al. | 318/46 |
| 2005/0029024 A1 * | 2/2005 | Takami et al. | 180/65.3 |
| 2006/0152180 A1 * | 7/2006 | Tahara et al. | 318/139 |

FOREIGN PATENT DOCUMENTS

| | | |
|---|---|---|
| JP | 11-004506 A | 1/1999 |
| JP | 2006-094691 A | 4/2006 |
| JP | 2006-197756 A | 7/2006 |
| JP | 2006-315451 A | 11/2006 |
| JP | 2006-325374 A | 11/2006 |
| JP | 2007-020383 A | 1/2007 |

OTHER PUBLICATIONS

Office Action issued in JP 2008-268541 on May 15, 2012 & partial English translation thereof.

* cited by examiner

*Primary Examiner* — Paul Ip
(74) *Attorney, Agent, or Firm* — Kenyon & Kenyon LLP (57) ABSTRACT

In a vehicle control system that includes an engine, a first rotary electric machine, a second rotary electric machine and a transmission, a control unit includes a shift state acquisition module that acquires a shift state of a vehicle; a stepped-up voltage reduction permission module that determines whether reduction of a system voltage is permitted on the basis of the acquired shift state; a stepped-up voltage reduction execution module that reduces the system voltage to a predetermined upper limit voltage when reduction of the system voltage is permitted; and a drive control module that controls operations of a converter and inverter to thereby control the first rotary electric machine and the second rotary electric machine.

10 Claims, 7 Drawing Sheets

VEHICLE CONTROL SYSTEM

INCORPORATION BY REFERENCE

The disclosure of Japanese Patent Application No. 2008-268541 filed on Oct. 17, 2008 including the specification, drawings and abstract is incorporated herein by reference in its entirety.

BACKGROUND OF THE INVENTION

1. Field of the Invention

The invention relates to a vehicle control system and, more particularly, to a vehicle control system that includes a rotary electric machine connected to a drive shaft of a vehicle via a transmission and an inverter that operates on a system voltage that is stepped up or down by a converter and that drives the rotary electric machine.

2. Description of the Related Art

A rotary electric machine mounted on a vehicle is operated by a circuit, such as an inverter, and, for example, drives a drive shaft of the vehicle via an adequate transmission. Thus, the rotational speed and torque of the rotary electric machine may possibly fluctuate depending on, for example, operation of the transmission or a load from a road surface, or the like, via the transmission.

For example, Japanese Patent Application Publication No. 2006-325374 (JP-A-2006-325374) describes that a step-up converter is provided between a direct-current power source and an inverter in an electric vehicle equipped with a transmission between an electric motor and a drive shaft, and also describes a load driving device for controlling a voltage output from the step-up converter on the basis of an output of the electric motor. The load driving device carries out torque reduction process to reduce the output torque of the electric motor during shifting in order to prevent an increase in rotational speed of the electric motor due to engagement and release of frictional elements at the time when the transmission shifts gears. Then, as a stepped-up voltage is reduced at that time, it causes unstable control because rectangular-wave control having a long control period assumes that the stepped-up voltage is constant. Thus, JP-A-2006-325374 describes that the stepped-up voltage is not reduced at the time when the transmission shifts gears.

Japanese Patent Application Publication No. 2007-20383 (JP-A-2007-20383) describes a controller for a vehicle that includes a motor that drives a wheel, an inverter that drives the motor, and a step-up converter that supplies electric current from a direct-current power source to the inverter. In the controller, for a torque constant command, as the wheel slips, the rotational speed of the motor steeply increases and, therefore, electric power consumption increases. Thus, control for supplying the motor with a larger amount of electric power is executed. However, when the wheel gets a grip thereafter, the rotational speed of the motor steeply decreases and, therefore, electric power supplied from the step-up converter becomes excessive. Then, JP-A-2007-20383 describes that a slip is detected on the basis of an increase in q-axis current to switch from rectangular-wave control over to PWM control and to reduce a target voltage of the step-up converter, and, in addition, the target voltage is reduced on the basis of a gear ratio if equipped with a transmission.

Japanese Patent Application Publication No. 2006-94691 (JP-2006-94691) describes a power output device. The power output device executes control, such as torque limiting, or the like, by calculating input/output allowable limits of a battery from a differential electric power obtained by subtracting assumed electric powers respectively input to MG1 and MG2 from an input/output electric power of the battery and Win and Wout of the battery when the driving state of an electric motor greatly changes because of a shift of a transmission, or the like. Then, JP-2006-94691 describes that, when the driving state of the electric motor greatly changes because of a shift of the transmission, or the like, the differential electric power also greatly changes, so the time constant used for calculating the differential electric power is reduced to prompt calculation of the differential electric power to thereby prompt process, such as torque limiting, thus preventing charging or discharging of the battery with an excessive electric power.

Japanese Patent Application Publication No. 2006-315451 (JP-A-2006-315451) describes a power output device that connects an engine, a first motor and a drive shaft to a planetary gear mechanism and that connects a second motor to the drive shaft via a transmission. In the power output device, as the voltage between battery terminals exceeds an upper or lower threshold, a switching state flag is set at 1, and, as the switching flag becomes 1 while the transmission is in upshifting, a hydraulic pressure command to a brake of the transmission is changed to decrease a rate of change in rotational speed of the second motor. JP-A-2006-315451 describes that this can prevent an excessive electric power input to or output from the battery due to a variation in electric power consumption of the second motor caused by a delay of sensing, or the like.

As described in the existing arts, the torque and rotational speed of the rotary electric machine connected to the transmission fluctuate depending on the operating state, or the like, of the vehicle. In this case, for example, as the electric power consumption of the rotary electric machine steeply varies because of a steep variation in rotational speed and torque of the rotary electric machine, a balance in electric power in a power supply circuit that drives the rotary electric machine greatly varies. This may, for example, cause an overvoltage or an undervoltage. In this case, an electrical component, such as a capacitor, that constitutes the power supply circuit for driving the rotary electric machine is subjected to a voltage above a rated value and may be damaged. Particularly, with miniaturization of electrical components, or the like, in order to provide a small light-weight vehicle-mounted unit, the rated values thereof also decrease. Therefore, it is necessary to take into consideration an overvoltage, or the like.

SUMMARY OF THE INVENTION

The invention provides a vehicle control system that is able to prevent a situation that an electrical component, or the like, enters an overvoltage state when the rotational speed of the rotary electric machine changes.

An aspect of the invention provides a vehicle control system. The vehicle control system includes: a rotary electric machine that is connected to a drive shaft of a vehicle via a transmission; an inverter that operates on a system voltage that is stepped up or down by a converter and that drives the rotary electric machine; and a control unit that acquires a shift state of the vehicle, that determines whether reduction of the system voltage is permitted on the basis of the acquired shift state, and that reduces the system voltage to a predetermined upper limit voltage when reduction of the system voltage is permitted.

With the above vehicle control system, the vehicle control system acquires the shift state of the vehicle, determines whether reduction of the system voltage is permitted on the basis of the acquired shift state, and reduces the system voltage to the predetermined upper limit voltage when reduction of the system voltage is permitted. By so doing, for example, when there is a possibility that a balance in electric power in the rotary electric machine collapses on the basis of the shift state of the vehicle, the system voltage is reduced. Therefore, it is possible to prevent an overvoltage of an electrical component, or the like, of a drive circuit.

In the vehicle control system, the control unit may determine to permit reduction of the system voltage when the shift state of the vehicle cannot be acquired or when there is a shift request to the vehicle, and may determine not to permit reduction of the system voltage when the vehicle is shifting gears or when there is no shift request to the vehicle.

The time when the shift state of the vehicle cannot be acquired is, for example, when a shift state is different from that of a shift command because of erroneous shift operation, the influence of a road surface, or the like. With the above vehicle control system, the system voltage is reduced for safety in such a case, so it is possible to prevent an unexpected overvoltage from occurring in an electrical component of the drive circuit.

In addition, when there is a shift request to the vehicle, the rotational speed of the rotary electric machine may steeply vary because of operation of the transmission. This may collapse the balance between electric power consumed by a power supply circuit and electric power supplied to the power supply circuit. In this case as well, the system voltage is reduced, so it is possible to prevent an overvoltage. Other than the above, the system voltage is not reduced, so it is possible to drive the vehicle as desired.

In the vehicle control system, the control unit may permit reduction of the system voltage when the vehicle is accelerating and there is a shift request for shifting the transmission from a low gear to a high gear or when the vehicle is decelerating and there is a shift request for shifting the transmission from the high gear to the low gear.

When the gear is shifted from low to high while the vehicle is accelerating, both the rotational speed and torque of the rotary electric machine steeply reduce, and then the electric power consumption of the rotary electric machine steeply reduces. The above steeply reduced electric power is regenerated to a smoothing capacitor of the inverter, the voltage between both terminals of the smoothing capacitor jumps and then an electrical component, such as the smoothing capacitor, of the drive circuit is subjected to an overvoltage.

In addition, when the gear is shifted from high to low while the vehicle is decelerating, control for steeply reducing the torque of the rotary electric machine may be executed in order to prevent an overshoot of the rotational speed of the rotary electric machine. In this case as well, the electric power consumption of the rotary electric machine steeply reduces, and an electrical component of the power supply circuit is subjected to an overvoltage. With the above vehicle control system, reduction of the system voltage is permitted in these cases, so it is possible to prevent an overvoltage of an electrical component of the power supply circuit.

In the vehicle control system, the control unit may be configured so that an amount by which the system voltage is reduced when the rotary electric machine is decelerated is larger than an amount by which the system voltage is reduced when the rotary electric machine is accelerated.

The time when rotary electric machine is decelerated is when the transmission shifts from low to high. The time when the rotary electric machine is accelerated is when the transmission shifts from high to low. When the rotary electric machine is accelerated, the counter electromotive force of the rotary electric machine increases. Thus, as the system voltage Vm is excessively reduced, chatter may occur in control of the rotary electric machine. Then, with the above vehicle control system, when the rotary electric machine is accelerated, reduction of the system voltage is made relatively small to thereby make it possible to ensure controllability of the rotary electric machine.

In the vehicle control system, the control unit may reduce the system voltage to the predetermined upper limit voltage prior to a shift of the transmission when reduction of the system voltage is permitted because there is a shift request to the vehicle.

In the gear change, the low-side and high-side of a transmission mechanism are engaged and released, and, during then, a duration during which no torque is transmitted may occur. At this time, the torque of the rotary electric machine steeply reduces. With the above vehicle control system, by reducing the system voltage prior to the steep reduction in torque, it is possible to prevent an overvoltage of an electrical component of the drive circuit due to a steep reduction in electric power consumption of the rotary electric machine.

In other words, the system voltage is reduced prior to the gear change command. Therefore, even when the rotational speed of the rotary electric machine is steeply reduced to a certain degree by the gear change command, an overvoltage of the smoothing capacitor may be prevented. Thus, by adjusting a degree to which the rotational speed of the rotary electric machine is steeply reduced, it is possible to complete a shift in a short period of time. This can shorten a duration during which a driver receives a free running feel attended with the shift. In addition, by completing the shift in a short period of time, it is possible to reduce a load on the transmission. This can reduce wear of the frictional material of the transmission.

In the vehicle control system, the control unit may output a torque variation command for the rotary electric machine in response to the shift request and, after that, a predetermined variation period of time later the control unit may output a gear change command for the transmission.

With the above vehicle control system, by appropriately shortening the variation period of time, it is possible to complete a shift in a short period of time. This can shorten a duration during which a driver receives a free running feel attended with the shift.

In the vehicle control system, the control unit may set a predetermined rate of change for at least any variation in voltage of when the system voltage is reduced or when the system voltage is returned from a reduced state.

Because a free running feel occurs during shifting, for example, in the case of a system that is able to increase the torque of the generator rotary electric machine in order to reduce the free running feel, the electrical storage device shifts into the charging side with an increase in generator torque. Here, when the system voltage is steeply decreased, electric power in the smoothing capacitor of the inverter flows into the electrical storage device and, therefore, the electrical storage device may be subjected to an overvoltage. With the above vehicle control system, by setting a predetermined rate of change at which the system voltage is decreased, it is possible to slow the flow of current to the electrical storage device, thus making it possible to prevent an overvoltage of the electrical storage device.

In addition, when the system voltage is returned, the stepped-up voltage of the converter may be overshot. However, the system voltage is returned at a predetermined rate of change, the stepped-up voltage may be slowly returned, thus making it possible to prevent an overshoot.

In the vehicle control system, the control unit may return the system voltage to a state before reduction after execution of a gear change command for the transmission is completed.

With the above vehicle control system, the vehicle control system may be immediately returned to a state before shifting, so it is possible to improve stability of the system overall.

In the vehicle control system, the control unit may switch a control mode for driving the inverter among a sinusoidal-wave control mode, an overmodulation current control mode and a rectangular-wave voltage phase control mode, and may vary the system voltage within a voltage range of an operating range of the same control mode between before and after variation of the system voltage.

For example, as the transmission is shifted from low to high when drive control is performed in the rectangular-wave control mode, the operating point of the rotary electric machine shifts into a low rotational speed side. At this time, when the system voltage is reduced beforehand, the operating range of the rectangular-wave control mode also shifts into a low rotational speed side. Thus, with the above vehicle control system, reduction of the system voltage is appropriately set before a shift of the transmission. By so doing, the operating point of the rotary electric machine may remain within the operating range of the rectangular-wave control mode between before and after a shift of the transmission. In this way, it is possible to eliminate the necessity of switching the control mode. This can prevent chatter that may occur when the control mode is switched.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

Hereinafter, an embodiment of the invention will be described in detail with reference to the accompanying drawings. The following will describe a vehicle that includes an engine and a rotary electric machine and to which a vehicle control system is applied; however, it is only necessary that the rotary electric machine is connected to a drive shaft of the vehicle via a transmission and, as the cases may be, the engine may be omitted. In addition, the following will describe two motor generators, each having a motor function and a generator function, as the rotary electric machines mounted on the vehicle; however, it is only illustrative. Instead, it is also applicable that a rotary electric machine having only a motor function and a rotary electric machine having only a generator function are used. Furthermore, it is also applicable that only one motor generator is used or three or more motor generators are used.

In addition, the following will describe a combination of a two-speed gear transmission and a gear mechanism having a fixed gear ratio, as a transmission unit provided between the driving rotary electric machine and the drive shaft of the vehicle. It is only necessary that a structure has at least two-speed gears. For example, the transmission may have three or more speed gears, or, other than the multiple-speed transmission, may include a plurality of gear mechanisms each having an appropriate fixed gear ratio.

Hereinafter, in all the drawings, like reference numerals denote the same components, and the overlap description is omitted. In addition, in the description, reference numerals referred to by that time are used where appropriate.

Figure 1:
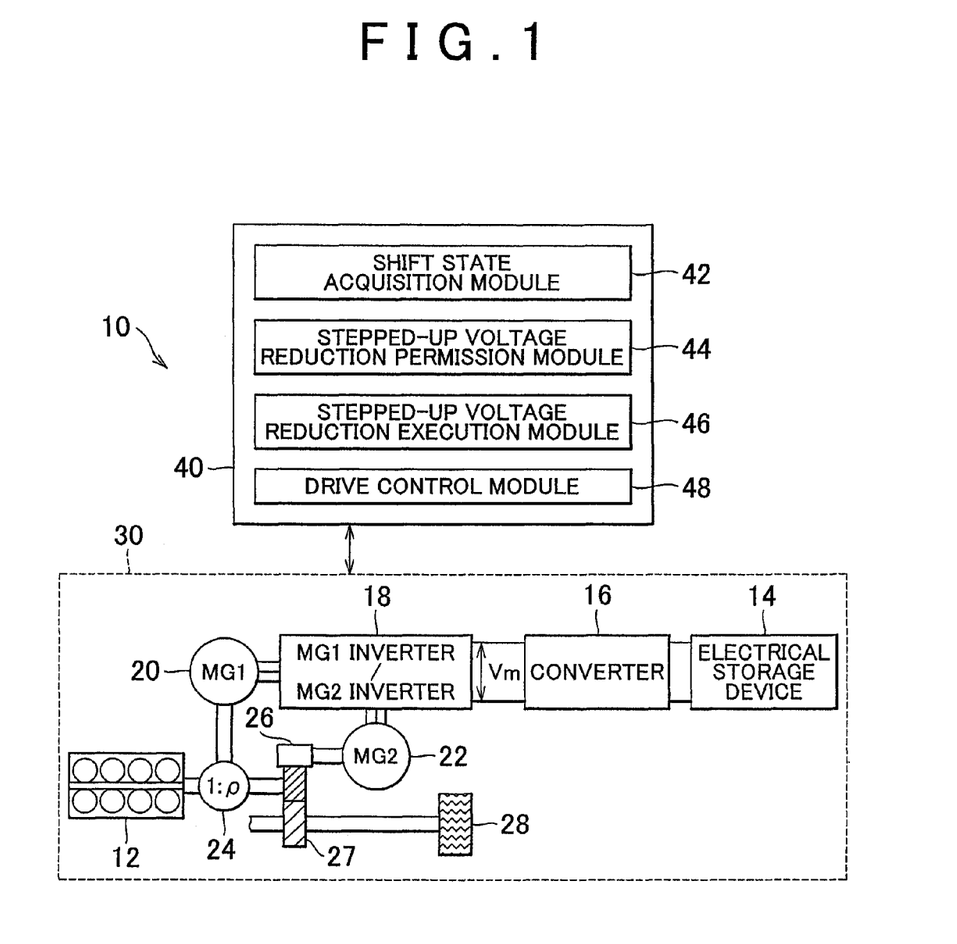
FIG. 1 is a view that shows the configuration of a vehicle control system according to an embodiment of the invention.

FIG. 1 is a view that shows the configuration of a vehicle control system 10 for a vehicle that includes an engine and a rotary electric machine. The vehicle control system 10 includes a vehicle driving unit 30 and a control unit 40. The control unit 40 controls operations of components of the driving unit 30.

The vehicle driving unit 30 uses an engine 12 and an electrical storage device 14 as power sources, and includes a first rotary electric machine (MG1) 20 and a second rotary electric machine (MG2) 22. In addition, the vehicle driving unit 30 further includes a converter 16, an inverter 18, a power distribution mechanism 24, a transmission 26, and a wheel or tire 28. The converter 16 is connected between the electrical storage device 14 and the two rotary electric machines 20 and 22. The power distribution mechanism 24 is used to distribute power among the engine 12, the first rotary electric machine 20 and the second rotary electric machine 22. The transmission 26 is provided between the power distribution mechanism 24 and the second rotary electric machine 22. The wheel or tire 28 receives driving force from the transmission 26 via a gear mechanism 27.

The engine 12 is a multi-cylinder internal combustion engine. The engine 12 constitutes a vehicle driving source together with the first rotary electric machine 20 and the second rotary electric machine 22. The engine 12 not only has a function of driving the drive shaft of the vehicle via the power distribution mechanism 24, and the like, to rotate the tire 28 for driving the vehicle but also has a function of generating power using the first rotary electric machine 20 as a generator to charge the electrical storage device 14.

The power distribution mechanism 24, the transmission 26 and the gear mechanism 27 have a function of regulating the outputs of the engine 12, first rotary electric machine 20 and second rotary electric machine 22, converting the outputs into the torque and rotational speed required for driving the vehicle, or the like, and then transmitting the converted torque and rotational speed to the tire 28 via the drive shaft of the vehicle. These may be collectively termed a power transmission mechanism of the vehicle.

The power distribution mechanism 24 has a function of distributing power among the engine 12, the first rotary electric machine 20 and the second rotary electric machine 22. A planetary mechanism may be used as the power distribution mechanism 24. For example, the planetary mechanism has a sun gear that is connected to the first rotary electric machine 20, a carrier that revolves pinion gears and that is connected to the engine 12, and a ring gear that is connected to the drive shaft of the vehicle via a reduction mechanism. The reduction mechanism may be connected to the second rotary electric machine 22 via the transmission. Note that a planetary gear ratio, which is the gear ratio of the power distribution mechanism 24, is shown as 1:ρ in FIG. 1.

The transmission 26 has a function of increasing or decreasing the torque by varying the rotational speed of the rotary electric machine 22. The transmission 26 has a low gear and a high gear. For example, as the gear is shifted from low to high, the drive shaft may be rotated at a higher speed even when the rotary electric machine 22 rotates at the same rotational speed. Thus, it is possible to drive the vehicle at a high speed. Conversely, as the gear is shifted from Hi to Lo, the torque of the rotary electric machine 22 is increased to make it possible to drive the drive shaft at a higher torque. The transmission 26 may be a gear transmission mechanism that is able to change a mesh among a plurality of gears having a different number of teeth. Note that a mechanism similar to the planetary mechanism used for the power distribution mechanism 24 may be used as the transmission 26.

The gear mechanism 27 has a function of transmitting the sum of the output of the power distribution mechanism 24 and the output of the transmission 26 to the drive shaft. The gear mechanism 27 has a fixed gear ratio. The gear mechanism 27 may be configured as part of the transmission 26.

Figure 2:
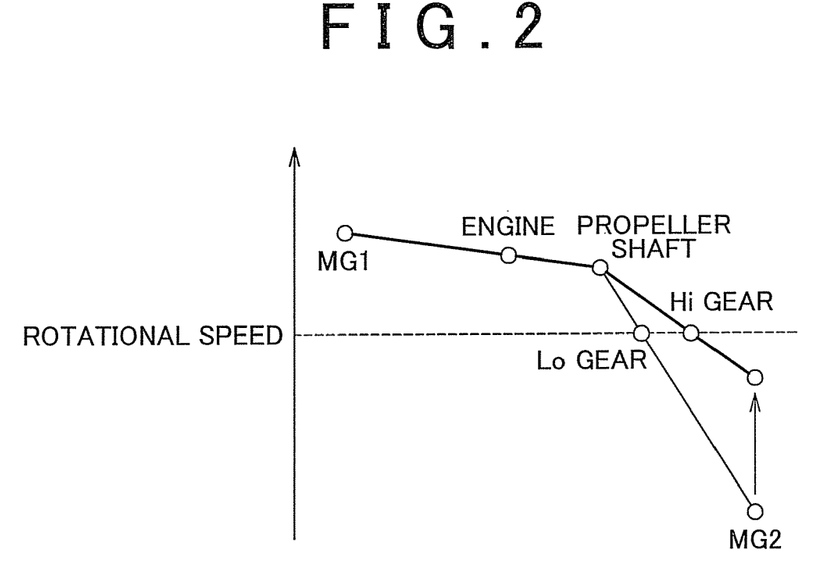
FIG. 2 is a nomograph that shows the function of a power transmission mechanism according to the embodiment of the invention.

FIG. 2 is a nomograph that shows the function of the power transmission mechanism. In the nomograph, the ordinate axis represents the rotational speed and the abscissa axis represents the geometrical arrangement of the components. When the components constitute a gear mechanism, the abscissa axis corresponds to a position proportional to the number of teeth of a gear, and the ratio in distance between the adjacent components corresponds to a gear ratio, that is, a speed reduction ratio.

In the abscissa axis of FIG. 2, the position of the first rotary electric machine (MG1) 20 represents the position of the sun gear of the planetary mechanism, the position of the engine 12 represents the position of the pinion gears of the planetary mechanism, and the position indicated as a propeller shaft represents a position corresponding to the ring gear of the planetary mechanism. The propeller shaft is the drive shaft connected to the tire 28. However, the gear mechanism 27 is provided, so FIG. 2 indicates the position corresponding to the ring gear at a position including the gear ratio of the gear mechanism. Here, in the abscissa axis of FIG. 2, the ratio of a distance between the sun gear and the pinion gears to a distance between the pinion gears and the ring gear is the planetary ratio and is 1 to ρ.

The transmission 26 is provided between the propeller shaft and the second rotary electric machine 22, so FIG. 2 shows a state where the transmission 26 is in a high gear and a state where the transmission 26 is in a low gear. Here, in process of increasing the rotational speed of the propeller shaft by controlling the operation of the engine 12, as the transmission 26 is shifted from the low gear into the high gear, the gear ratio of the transmission 26 is changed, so the rotational speed of the second rotary electric machine 22 steeply decreases. This is shown on the nomograph of FIG. 2.

Referring back to FIG. 1, the first rotary electric machine (MG1) 20 and the second rotary electric machine (MG2) 22 are motor generators mounted on the vehicle. The first rotary electric machine (MG1) 20 and the second rotary electric machine (MG2) 22 each are three-phase synchronous rotary electric machine that functions as a motor when supplied with electric power from the electrical storage device 14 and that functions as a generator when the vehicle is driven by the engine 12 or when the vehicle is braking.

Here, the first rotary electric machine (MG1) 20 is driven by the engine 12 and is used as a generator. The first rotary electric machine (MG1) 20 is used to supply generated electric power to the electrical storage device 14 via the converter 16 and an MG1 inverter of the inverter 18. In addition, the second rotary electric machine (MG2) 22 is used for driving the vehicle. During power running, the second rotary electric machine (MG2) 22 may function as a motor by alternating-current electric power converted from direct-current electric power, supplied from the electrical storage device 14, via the converter 16 and the an MG2 inverter of the inverter 18 to drive the tire 28 of the vehicle. During braking, the second rotary electric machine (MG2) 22 may function as a generator to recover regenerative energy and then supply the recovered regenerative energy to the electrical storage device 14 via the converter 16 and the MG2 inverter of the inverter 18.

The converter 16 is arranged between the electrical storage device 14 and the inverter 18. The converter 16 is a circuit that has a voltage conversion function. The converter 16 may be configured to include a switching element, a reactor, and the like. The switching element operates under control of the control unit 40. The voltage conversion function includes a step-up function and a step-down function. In the step-up function, a voltage at the electrical storage device side is stepped up using the energy storage function of the reactor and is supplied to the inverter side. In the step-down function, electric power from the inverter side is stepped down and supplied to the electrical storage device side as charging electric power. When focusing on the step-up function, the converter 16 may be called step-up circuit. Hereinafter, the case where the converter 16 functions as a step-up circuit will be specifically described.

The inverter 18 is a circuit that converts electric power between alternating-current electric power and direct-current electric power. The inverter 18 is configured to include a plurality of switching elements that operate under control of the control unit 40. As described above, the first rotary electric machine (MG1) 20 and the second rotary electric machine (MG2) 22 have different applications and different operating point conditions, so the inverter 18 is formed of two inverter circuits inside. One of the two inverter circuits is the MG1 inverter for operating the first rotary electric machine (MG1) 20, and the other one is the MG2 inverter for operating the second rotary electric machine (MG2) 22.

A direct-current voltage between the positive bus and negative bus of the inverter 18 is an operating voltage of the inverter 18. The voltage determines the amplitude of an alternating-current voltage for operating each of the first rotary electric machine 20 and the second rotary electric machine 22. Therefore, this voltage may be termed a system voltage Vm. When the converter 16 functions as a step-up circuit, the system voltage Vm is a stepped-up voltage output from the converter 16. That is, it is possible to control the system voltage Vm through step-up control on the converter 16. Note that, when the converter 16 functions as a step-down circuit, the system voltage Vm is a direct-current voltage input to the converter 16. In any cases, the system voltage Vm is determined through step-up or step-down control on the converter 16.

The system voltage Vm fluctuates through exchange of electric power between the electrical storage device 14 and the first rotary electric machine 20 or the second rotary electric machine 22. In order to absorb the fluctuations, a smoothing capacitor is connected between the positive bus and the negative bus.

As described above, when the first rotary electric machine (MG1) 20 functions as a generator, the MG1 inverter has an AC-DC conversion function. In the AC-DC conversion function, alternating-current three-phase regenerative electric power from the first rotary electric machine (MG1) 20 is converted into direct-current electric power, and is supplied to the electrical storage device side as charging electric current. In addition, the MG2 inverter for operating the second rotary electric machine (MG2) 22 has a DC-AC conversion function and an AC-DC conversion function. In the DC-AC conversion function, when the vehicle is in power running, direct-current electric power from the electrical storage device side is converted into alternating-current three-phase driving electric power, and is supplied to the second rotary electric machine (MG2) 22 as driving electric power. In the AC-DC conversion function, when the vehicle is braking, alternating-current three-phase regenerative electric power from the second rotary electric machine (MG2) 22 is reversely converted into direct-current electric power, and is supplied to the electrical storage device side as charging electric current.

The control unit 40 has a function of comprehensively controlling the operations of the above described components. For example, the control unit 40 has a function of controlling the operation of the engine 12, a function of controlling the operations of the two rotary electric machines 20 and 22, a function of controlling the operations of the converter 16 and inverter 18, a function of controlling the operation of the power distribution mechanism 24, a function of controlling the operation of the transmission 26, and the like.

The control unit 40 may be formed of a controller that is suitable to be mounted on the vehicle, such as an in-vehicle computer. The control unit 40 may be formed of a single computer, or may be formed of multiple computers that share the above functions in consideration of difference in necessary throughput among the components, or the like. For example, it may be configured so that an engine electrical control unit (ECU) has a function of controlling the operation of the engine 12, an MG-ECU has a function of controlling the operations of the two rotary electric machines 20 and 22, and a power control unit (PCU) has a function of controlling the operations of the converter 16 and inverter 18, and then a comprehensive ECU comprehensively controls the above control units, the power distribution mechanism 24 and the transmission 26.

In FIG. 1, the control unit 40 particularly shows portions having a function of controlling a step-up state of the converter 16 on the basis of a shift state of the vehicle as a vehicle control function among the above described functions. That is, the control unit 40 includes a shift state acquisition module 42, a stepped-up voltage reduction permission module 44, a stepped-up voltage reduction execution module 46, and a drive control module 48. The shift state acquisition module 42 acquires the shift state of the vehicle. The stepped-up voltage reduction permission module 44 determines whether to permit reduction of the system voltage Vm on the basis of the acquired shift state. When reduction of the system voltage is permitted, the stepped-up voltage reduction execution module 46 reduces the system voltage to a predetermined upper limit voltage. The drive control module 48 controls the operations of the converter 16 and inverter 18 to thereby control the first rotary electric machine 20 and the second rotary electric machine 22.

These functions may be implemented by executing software and, specifically, may be implemented by executing a system voltage setting part in a vehicle control program. Part of these functions may be implemented by hardware.

The function of the above configuration, particularly, the functions of the control unit 40, will be described in detail below. Note that the content of the drive control module 48 is not specifically different between the two rotary electric machines 20 and 22, so drive control for the second rotary electric machine 22 will be described below as a typical example.

First, in regard to the drive control module 48, three drive control modes of the rotary electric machine 22, that is, a sinusoidal-wave current control mode, an overmodulation current control mode and a rectangular-wave voltage phase control mode, will be described.

Each of the sinusoidal-wave current control mode and the overmodulation current control mode is a current feedback control, and is a control that compares a voltage command with a carrier wave (carrier) to output a pulse width modulation (PWM) pattern to the rotary electric machine 22. On the other hand, the rectangular-wave voltage phase control mode is a control that outputs a one-pulse switching wave to the rotary electric machine 22 on the basis of an electrical angle. In the rectangular-wave voltage phase control mode, the voltage amplitude is fixed to a maximum value, and the phase is controlled to control the torque in a feedback manner. These three control modes are executed by the function of the drive control module 48.

The three modes, that is, the sinusoidal-wave current control mode, the overmodulation current control mode and the rectangular-wave voltage phase control mode, are switched by a modulation percentage or a voltage command amplitude corresponding to the modulation percentage. The modulation percentage is the ratio of a signal amplitude to a voltage output from the inverter. In the case of a PWM mode that compares a sinusoidal wave with a triangular wave, the modulation percentage is $\{(3)^{1/2}\}/2\{(2)^{1/2}\}=0.61$, and the modulation percentage at the time when the rectangular wave is a signal amplitude is $\{(6)^{1/2}\}/\pi=0.78$.

Thus, in order for the rotary electric machine 22 to output high power, the rectangular-wave voltage phase control that is able to increase the modulation percentage is suitable. On the other hand, in the sinusoidal-wave current control mode or the overmodulation current control mode, a quasi-sinusoidal wave formed by PWM technique is used, so it is possible to increase the speed of response as compared with the rectangular-wave voltage phase control mode. For the above reason, it is desirable that the sinusoidal-wave current control mode is used in a low rotational speed range, the overmodulation current control mode is used in an intermediate rotational speed range and the rectangular-wave voltage phase control mode is used in a high rotational speed range.

Figure 3:
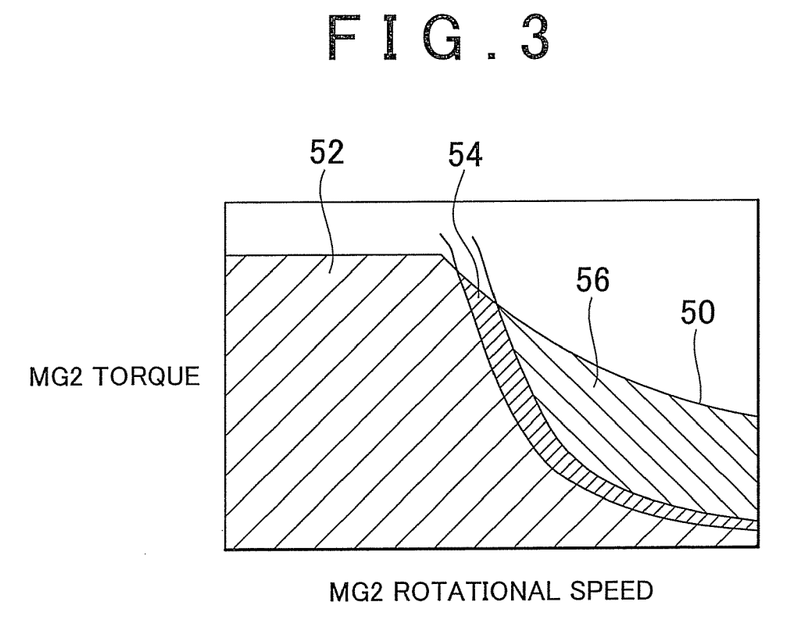
FIG. 3 is a map that shows a state where a control mode is selected on the basis of an operating point of a rotary electric machine.

FIG. 3 is a map that illustrates a state where the control mode is selected on the basis of the operating point of the rotary electric machine. In the map, the abscissa axis represents the rotational speed of the rotary electric machine 22, and the ordinate axis represents the torque. The map shows a maximum torque characteristic curve 50 that indicates the maximum torque when power that can be output from the rotary electric machine 22 is constant. Furthermore, the map shows which control mode is used in operating ranges indicated by the maximum torque characteristic curve 50. As indicated by the map, a sinusoidal-wave current control mode operating range 52 is set at a low rotational speed side, a rectangular-wave voltage phase control mode operating range 56 is set at a high rotational speed side, and an overmodulation current control mode operating range 54 is set between the low rotational speed side and the high rotational speed side.

Figure 4:
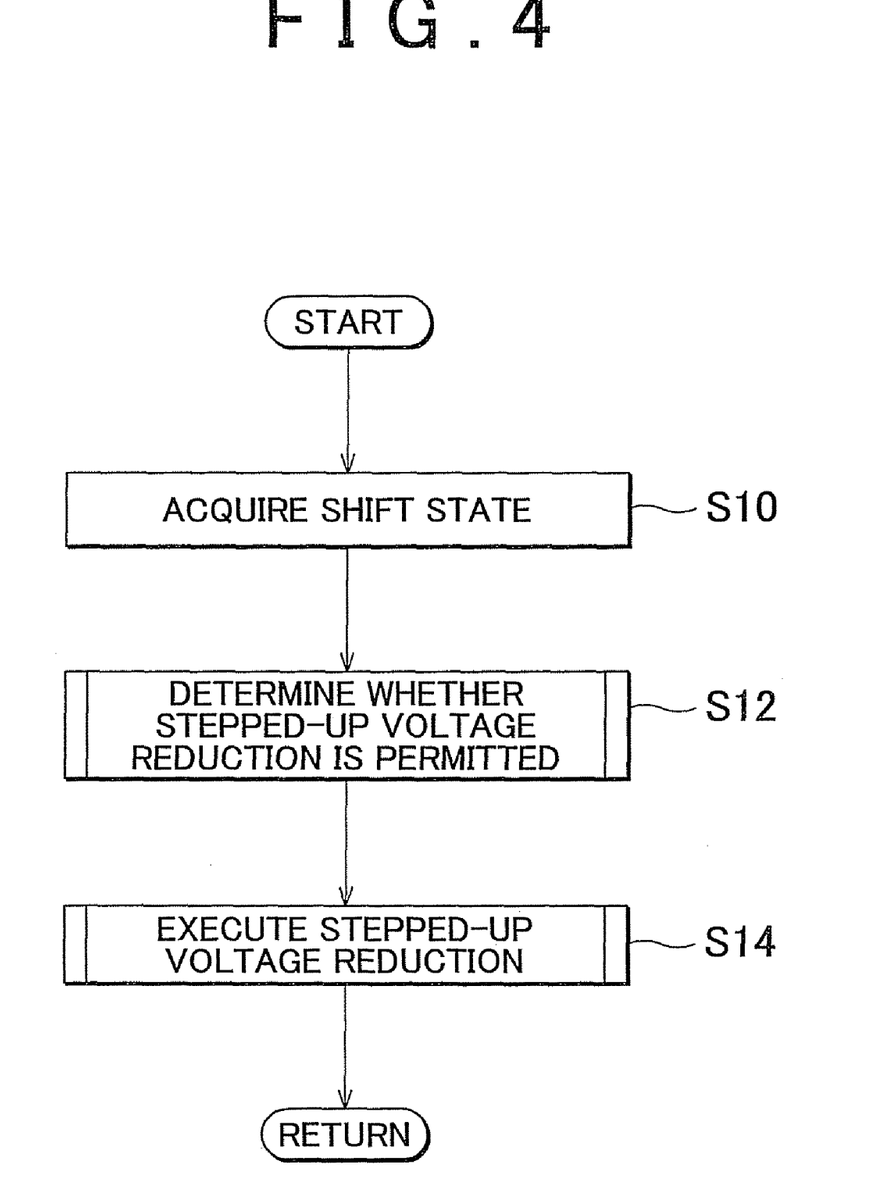
FIG. 4 is a flowchart that shows the overall procedural steps for controlling the step-up state of a converter on the basis of a shift state of a vehicle according to the embodiment of the invention.
Figure 5:
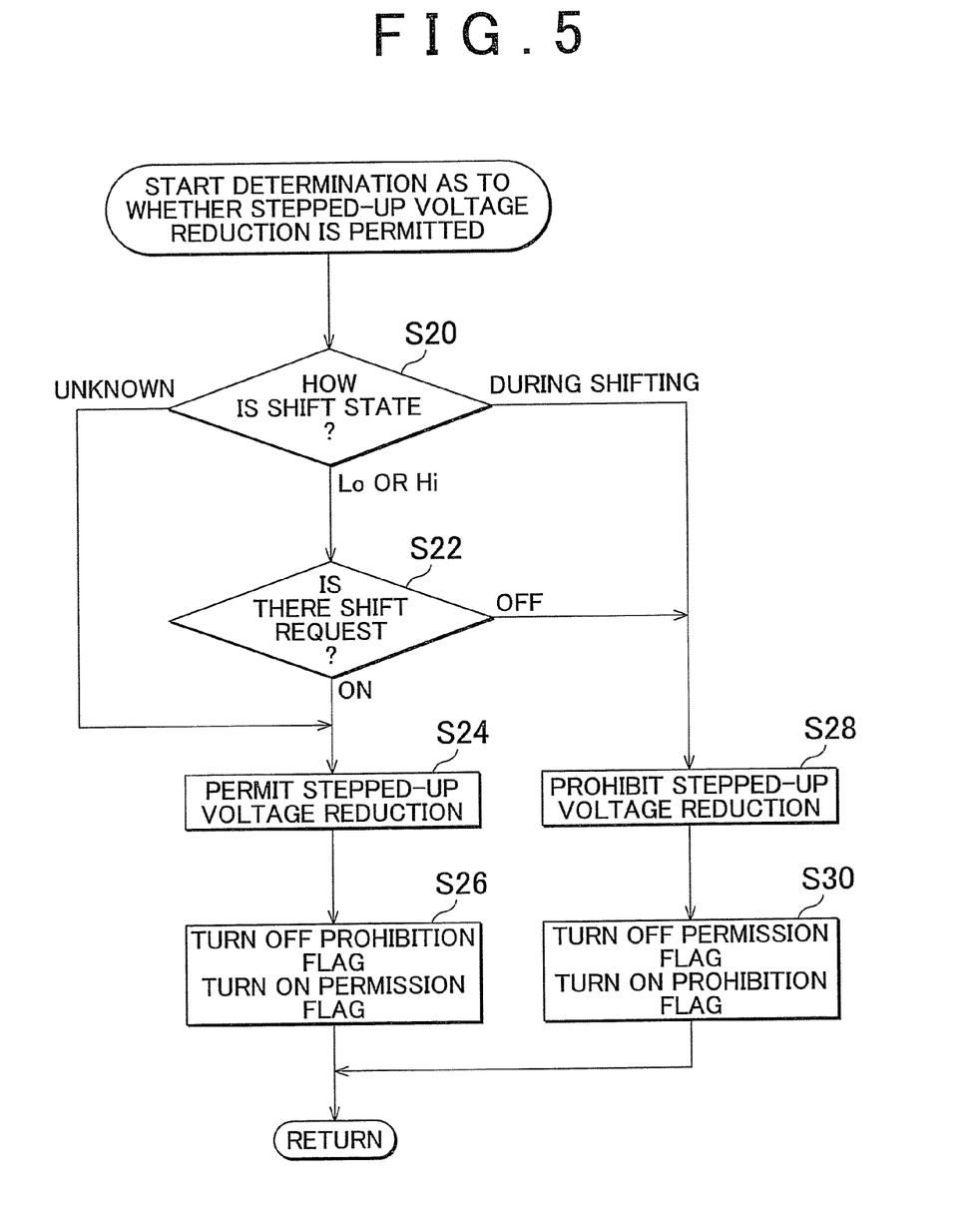
FIG. 5 is a flowchart that shows the internal procedural steps of determination as to whether stepped-up voltage reduction is permitted in FIG. 4.
Figure 6:
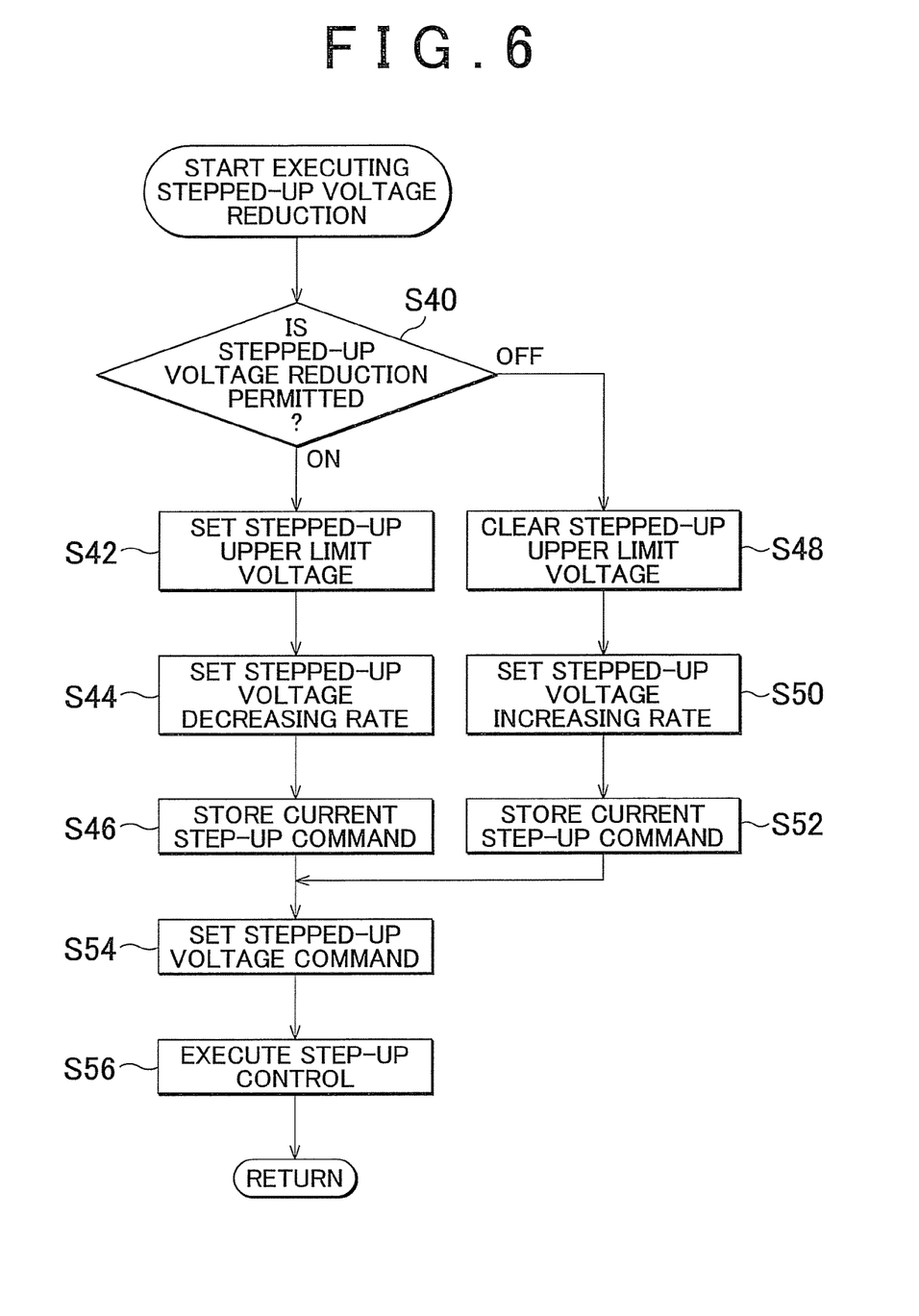
FIG. 6 is a flowchart that shows the internal procedural steps of executing stepped-up voltage reduction in FIG. 4.
Figure 7:
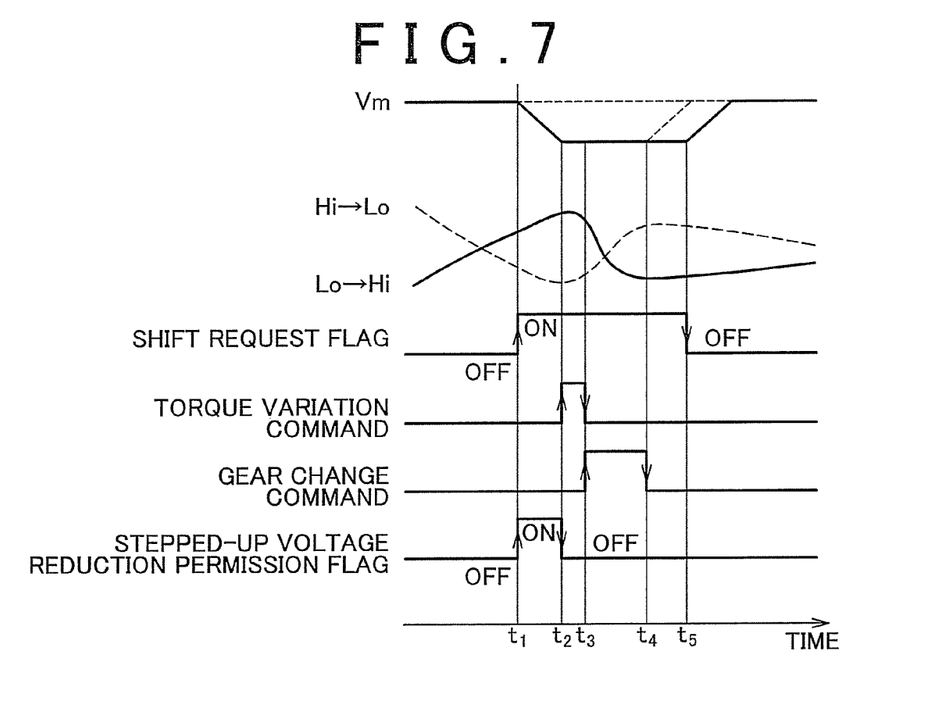
FIG. 7 is a time chart that shows changes in states of components at the time when the step-up state of the converter is controlled on the basis of the shift state of the vehicle according to the embodiment of the invention.

Next, the function of controlling the step-up state of the converter 16 on the basis of a shift state of the vehicle will be described with reference to FIG. 4 to FIG. 7. FIG. 4 to FIG. 7 are flowcharts that show the procedural steps of controlling the step-up state of the converter 16 on the basis of a shift state of the vehicle. FIG. 4 is a flowchart that shows the overall procedural steps. FIG. 5 is a flowchart that shows the internal procedural steps of determination as to whether stepped-up voltage reduction is permitted in FIG. 4. FIG. 6 is a flowchart that shows the internal procedural steps of executing stepped-up voltage reduction in FIG. 4. FIG. 7 is a time chart that shows changes in states of the components in these procedural steps. The procedural steps of these flowcharts correspond to procedures in the system voltage setting part of the vehicle control program.

FIG. 4 is a flowchart that shows the overall procedural steps at the time when the step-up state of the converter 16 is controlled on the basis of a shift state of the vehicle. Here, the shift state is initially acquired (S10). This step is executed by the function of the shift state acquisition module 42 of the control unit 40. The shift state may be acquired by acquiring control state signals for the function of a transmission controller included in the function of the control unit 40. The control state signals may be the rotational speed of an output shaft of the transmission 26, the rotational speed of an output shaft of the rotary electric machine 22, which is the rotational speed of an input shaft of the transmission 26, and the like. On the basis of these signals, it is possible to identify, on the basis of a shift control state signal, for example, whether the transmission 26 is currently in the high gear or in the low gear, whether the transmission 26 is in a transient state where the transmission 26 is shifting gears, or the like.

As the shift state is acquired, it is determined on the basis of the acquired shift state whether stepped-up voltage reduction is permitted (S12). This step is executed by the function of the stepped-up voltage reduction permission module 44 of the control unit 40. The detail of this step will be described later with reference to FIG. 5.

When it is determined in S12 that stepped-up voltage reduction is permitted, stepped-up voltage reduction is executed (S14). This step is executed by the function of the stepped-up voltage reduction execution module 46 of the control unit 40. The detail of this step will be described with reference to FIG. 6.

FIG. 5 is a flowchart that shows the internal procedural steps of determination as to whether stepped-up voltage reduction is permitted (S12) in FIG. 4. Here, it is determined whether stepped-up voltage reduction is permitted on the basis of the shift state, so the shift state is determined. That is, as the shift state is acquired in S10 of FIG. 4, the shift state is classified into three types on the basis of the acquired content thereof. One of the three types is a case where the transmission 26 is in a low gear or in a high gear. In this case, the process proceeds to S22. Another one of the three types is a case where the transmission 26 is in a transient state during shifting from low to high or high to low. In this case, the process proceeds to S28.

The other one of the three types is a case where the shift state is unknown. The case where the shift state is unknown is a case where no shift state signal is acquired, a case where a shift command does not coincide with a shift state signal, or the like. For example, the case where the shift state is unknown is a case where the state of the transmission 26 is abnormal or the actual state of the gear cannot be determined because of a shift mistake, a case where, due to the influence of the condition of a road surface, fluctuations in rotational speed of the rotary electric machine before shifting are large and, therefore, the output rotational speed of the transmission 26 cannot be correctly identified, or the like. In this case, the process skips S22 and directly proceeds to S24.

When it is determined in S20 that the shift state is in a high gear or in a low gear, it is determined whether there is a shift request (S22). When the determination in S22 is affirmative, the process proceeds to S24. When the determination in S22 is negative, the process proceeds to S28.

When the determination in S22 is affirmative or when it is determined in S20 that the shift state is unknown, the execution of stepped-up voltage reduction is permitted (S24), a stepped-up voltage reduction permission flag is turned on, and a stepped-up voltage reduction prohibition flag is turned off (S26). The execution of stepped-up voltage reduction is permitted at the time when there is a shift request in order to decrease the system voltage Vm beforehand because there is a possibility that electrical components, such as the smoothing capacitor provided for the inverter 18 and the electrical storage device 14, are applied with an overvoltage when the transmission 26 shifts from high to low or from low to high. The reason why the execution of stepped-up voltage reduction is permitted at the time when the shift state is unknown is to decrease the system voltage Vm beforehand for safety because there is a possibility that electrical components are applied with an overvoltage as the cases may be.

When the determination in S22 is negative or when it is determined in S20 that the transmission 26 is shifting gears, the execution of stepped-up voltage reduction is not permitted but the execution of stepped-up voltage reduction is prohibited (S28), the stepped-up voltage reduction prohibition flag is turned on, and the stepped-up voltage reduction permission flag is turned off (S30). As stepped-up voltage reduction is executed, the system voltage Vm is reduced to the predetermined upper limit voltage, so the maximum power of the rotary electric machine 22 decreases, and travelling performance of the vehicle deteriorates. Thus, it is desirable that stepped-up voltage reduction is executed only when an overvoltage may occur in electrical components and, other than that, the system voltage Vm is not reduced but remains unchanged. By so doing, the vehicle travelling performance may be maintained.

After S26 or S30, the process returns to S20 again. Then, the steps following S20 are repeated and, in each case on the basis of the results, the status of the stepped-up voltage reduction prohibition flag and the status of the stepped-up voltage reduction permission flag are switched.

FIG. 6 is a flowchart that shows the internal procedural steps of executing stepped-up voltage reduction (S14) in FIG. 4. Here, the result of determination as to whether stepped-up voltage reduction is permitted is initially evaluated (S40). When stepped-up voltage reduction is permitted, the process proceeds to S42. When stepped-up voltage reduction is not permitted, the process proceeds to S48. The determination in S40 may be made on the basis of on or off of the stepped-up voltage reduction permission flag described in FIG. 5.

When the determination in S40 is affirmative, the system voltage, which is a voltage output from the converter 16, is reduced and set at the predetermined upper limit voltage (S42). The upper limit voltage is an upper limit voltage from which a voltage is not stepped up any more, and is set at a value by which the upper limit of a stepped-up voltage range in normal step-up control is suppressed to a lesser degree. For example, when the maximum value of the stepped-up voltage range in normal step-up control is $V_A$, a value obtained by multiplying $V_A$ by a reduction coefficient α smaller than or equal to 1 may be set as the upper limit voltage. The reduction coefficient α may be, for example, 0.9, 0.8, or the like. Of course, instead of the reduction coefficient α, it is also applicable that a predetermined constant reduced voltage is used and then the reduced voltage is used as the upper limit voltage.

Then, when the system voltage Vm is set at the upper limit voltage, for example, αVm, a stepped-up voltage decreasing rate is subsequently set (S44). The stepped-up voltage decreasing rate is a rate of change in voltage at which the system voltage Vm is reduced to αVm, which is the upper limit voltage. That is, the system voltage Vm is reduced not in a stepped manner but at an appropriately gentle rate of change.

This is because of the following reason. That is, because a free running feel occurs during shifting, for example, the torque of the first rotary electric machine 20, which is the generator rotary electric machine, may be increased in order to reduce the free running feel. In the case of a system that is able to execute the above process, the electrical storage device 14 shifts into the charging side with an increase in generator torque. Here, when the system voltage Vm is steeply reduced, electric power in the smoothing capacitor of the inverter 18 flows into the electrical storage device 14 and, therefore, the electrical storage device 14 may be subjected to an overvoltage. By setting a predetermined rate of change at which the system voltage Vm is reduced, it is possible to slow the flow of current to the electrical storage device 14, thus making it possible to prevent an overvoltage of the electrical storage device 14.

In this way, when the upper limit voltage of Vm and the decreasing rate are set, the status of a current step-up command is stored (S46). By so doing, setting of the step-up command is completed (S54), and specific step-up control is executed in accordance with the setting (S56). The content of the specific step-up control will be described with reference to FIG. 7. After S56, the process returns to S40 again, and then the steps following S40 are repeated sequentially.

In S40 of FIG. 6, when the determination is negative, that is, when it is determined that stepped-up voltage reduction is not permitted, if the system voltage Vm is reduced through stepped-up voltage reduction by then and is limited to the upper limit voltage, the state of that stepped-up upper limit voltage is cleared (S48). That is, the system voltage Vm, which has been reduced to αVm in the above example, is returned to the original system voltage Vm again.

For example, when there is a shift request in S22 of FIG. 5 and stepped-up voltage reduction is permitted in S24, as a shift of the transmission 26 is completed in response to the shift request thereafter, in the next cycle of the process, the determination is negative in S22 to proceed to S28. Then, stepped-up voltage reduction is prohibited, and the stepped-up voltage reduction permission flag is turned off. At this time, the determination in S40 of FIG. 6 is negative, so setting of the stepped-up upper limit voltage is cleared, and the system voltage is returned to the original system voltage Vm again. In other words, the system voltage Vm is once reduced in response to the shift request; however, the system voltage Vm is returned to the state before the system voltage Vm is reduced after a shift of the transmission 26 is completed, that is, after the execution of a gear change command for the transmission 26 is completed.

In this way, when it is determined that the setting of the upper limit voltage for the system voltage Vm is cleared, a stepped-up voltage increasing rate is subsequently set. The stepped-up voltage increasing rate is a rate of change in voltage at which the upper limit voltage αVm, to which the system voltage is reduced in the above example, is returned to the original system voltage Vm. That is, the system voltage Vm is returned not in a stepped manner but is increased at an appropriate gentle rate of change. When the system voltage is returned, the stepped-up voltage of the converter 16 may be overshot. However, the system voltage is returned at a predetermined rate of change, the stepped-up voltage may be slowly returned, thus making it possible to prevent an overshoot.

In this way, when setting of the upper limit voltage of Vm is cleared and the increasing rate is set, the current status of the step-up command is stored (S52). By so doing, as in the case of S46, setting of the stepped-up voltage command is completed (S54), and specific step-up control is executed in accordance with the setting (S56).

FIG. 7 is a time chart that shows a specific state of stepped-up voltage reduction and return. In FIG. 7, the abscissa axis represents time, and the ordinate axis represents states of the components. That is, FIG. 7 sequentially shows, on the sheet from the top toward the bottom, the system voltage Vm, the rotational speed of the rotary electric machine 22, a shift request flag that indicates a shift request from the control unit 40, a torque variation command from the control unit 40 to the rotary electric machine 22, a gear change command from the control unit 40 to the transmission 26 and a stepped-up voltage reduction permission flag to the converter 16 in the process executed by the control unit 40.

In FIG. 7, the states of the components change as follows over time when the transmission 26 shifts gears. Now, it is assumed that the transmission 26 is in a low gear and the rotational speed of the rotary electric machine 22 is increasing. This state corresponds to the case where the rotational speed of the rotary electric machine 22, which is the second from the top of FIG. 7, is indicated by the solid line. Note that the case where the rotational speed of the rotary electric machine 22 is indicated by the broken line will be described later.

Here, as the shift request flag turns on at time $t_1$, the determination in S22 of FIG. 5 is affirmative, and the stepped-up voltage reduction permission flag to the converter 16 turns on. In response to this, the system voltage Vm is reduced to the predetermined upper limit voltage. Then, as described in S44 of FIG. 6, the decreasing rate is set, and the system voltage Vm is reduced at the predetermined voltage decreasing rate. FIG. 7 shows a state where the system voltage Vm is reduced from time $t_1$ to time $t_2$.

When the system voltage Vm is reduced to the upper limit voltage at time $t_2$, the stepped-up voltage reduction permission flag to the converter 16 is returned to an off state. Then, under the situation that the system voltage Vm is reduced, the torque variation command is output. The torque variation command instructs the rotary electric machine 22 to once set the torque at zero or at a low value, that is, to carry out so-called torque release, in order to change the gear of the transmission 26.

At time $t_3$ at which the execution of the torque variation command is completed, the gear change command is output. The gear change command, in this case, instructs the transmission 26 to shift from the low gear to the high gear. Specifically, the gear change command is a command for causing gear trains from the low gear to the high gear, that is, causing so-called engagement and release of the frictional elements, for shifting.

As the gear is changed, as described in FIG. 2, the rotational speed of the rotary electric machine 22 steeply decreases. The above state is shown by the variation characteristic of the rotational speed of the rotary electric machine 22 at the second row from the top of FIG. 7. That is, the rotational speed of the rotary electric machine 22 steeply decreases from time $t_3$ to enter a decelerating state, and substantially settles down at a certain value at time $t_4$. With the decrease in rotational speed, the torque of the rotary electric machine 22 also decreases. Thus, the electric power consumption of the rotary electric machine 22 also steeply reduces. Then, there is a possibility that the above steeply reduced electric power is regenerated to the smoothing capacitor of the inverter 18, the system voltage Vm jumps and then an electrical component, such as the smoothing capacitor, of the drive circuit may be subjected to an overvoltage. With the configuration shown in FIG. 1 and FIG. 7, the system voltage Vm is reduced beforehand, so it is possible to prevent an overvoltage of the electrical component by that much.

Note that there occurs a duration during which the gear trains are separated and are not in mesh with each other while the gear change command is executed. During the above duration, no torque is transmitted to the drive shaft, so this may cause a so-called free running feel. A shift duration is between time $t_3$ and time $t_4$; however, the system voltage Vm is reduced, so the length of the shift duration is considerably shorter than that according to the existing art in which the system voltage Vm is not reduced. In this way, it is possible to shorten the duration, during which a driver receives a free running feel, on the basis of a degree of reduction in the system voltage Vm.

In addition, the shift duration may be shortened by reducing the system voltage Vm as compared with the existing art in which the system voltage Vm is not reduced. This reduces a loss of the frictional material during a shift of the transmission 26.

When the execution of the gear change command is completed at time $t_4$, an appropriate period of time later the shift request flag is returned to an off state at time $t_5$. By so doing, the reduction of the system voltage Vm to the upper limit voltage is cleared, and, as described in S50 of FIG. 6, a predetermined increasing rate is set, and then the system voltage reduced to the upper limit voltage is gradually returned to the original system voltage Vm.

Note that the system voltage may be returned immediately after the execution of the gear change command is completed without providing an appropriate period of time from time $t_4$. In FIG. 7, the broken line indicates the above case where the system voltage is returned in a short period of time. In this way, by adjusting a period of time from time $t_4$ to a return of the system voltage Vm as well, it is possible to shorten the duration during which a driver receives a free running feel.

The above description corresponds to the case where the transmission 26 is in a low gear, and the rotational speed of the rotary electric machine 22 is increasing. Similar process may be performed in the case where the transmission 26 is in a high gear, and the rotational speed of the rotary electric machine 22 is decreasing. The state of the rotational speed of the rotary electric machine 22 in this case is indicated by the broken line in FIG. 7.

For example, when the gear is shifted from high to low in a decelerating state, control for steeply reducing the torque of the rotary electric machine 22 may be executed in order to prevent an overshoot of the rotational speed of the rotary electric machine 22. In this case as well, the electric power consumption of the rotary electric machine 22 steeply reduces, and an electrical component of the inverter 18, or the like, is subjected to an overvoltage. In such a case, the system voltage Vm is reduced to make it possible to prevent an overvoltage of the electrical component.

Here, it is desirable that a degree to which the system voltage Vm is reduced is varied between when the rotary electric machine 22 is decelerated and when the rotary electric machine 22 is accelerated. That is, the amount by which the system voltage Vm is reduced when the rotary electric machine 22 is decelerated is set to be larger than the amount by which the system voltage Vm is reduced when the rotary electric machine 22 is accelerated. The time when the rotary electric machine 22 is decelerated is when the transmission 26 shifts from low to high. The time when the rotary electric machine 22 is accelerated is when the transmission 26 shifts from high to low. When the rotary electric machine 22 is accelerated, the counter electromotive force of the rotary electric machine 22 increases. Thus, as the system voltage Vm is excessively reduced, chatter may occur in control of the rotary electric machine 22. Then, when the rotary electric machine 22 is accelerated, reduction of the system voltage Vm is made relatively small to thereby make it possible to ensure controllability of the rotary electric machine 22.

In addition, in regard to control over the rotary electric machine 22, when a control mode for driving the inverter 18 is switched among the sinusoidal-wave control mode, the overmodulation current control mode and the rectangular-wave voltage phase control mode, the system voltage may be varied within the voltage range of the operating range of the same control mode between before and after variation of the system voltage. For example, as the transmission 26 is shifted from low to high when drive control is performed in the rectangular-wave control mode, the rotary electric machine 22 decelerates as described above, and then the operating point shifts to a low rotational speed side. At this time, when the system voltage Vm is reduced beforehand, the operating range of the rectangular-wave control mode also shifts to a low rotational speed side. Thus, reduction of the system voltage is appropriately set before the transmission 26 shifts gears. By so doing, the operating point of the rotary electric machine 22 may remain within the operating range of the rectangular-wave control mode between before and after the transmission 26 shifts gears. For example, pre-shift and post-shift operating points both may be set within the rectangular-wave voltage phase control mode operating range 56. In this way, it is possible to eliminate the necessity of switching the control mode. This can prevent chatter that may occur when the control mode is switched.

Figure 8:
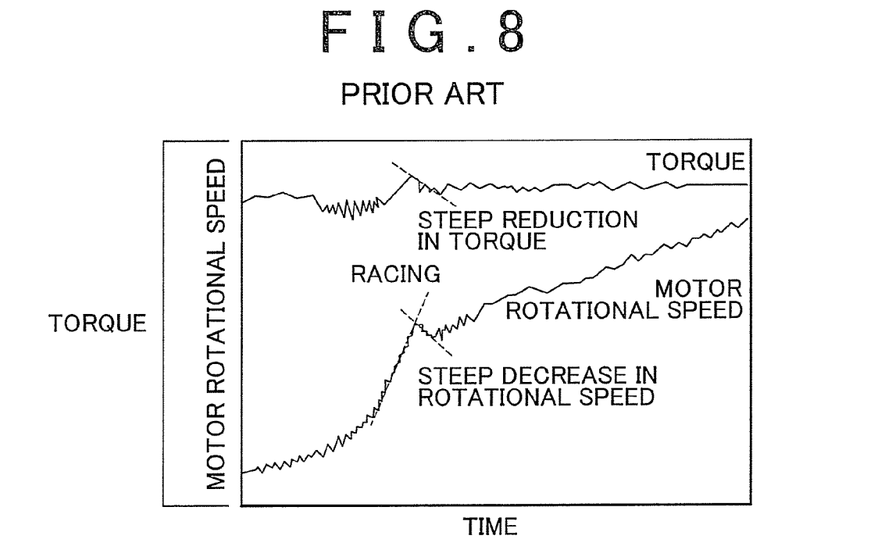
FIG. 8 is a graph that shows a state where motor rotational speed and torque steeply decrease at the time of a shift of a transmission according to an existing art.
Figure 9:
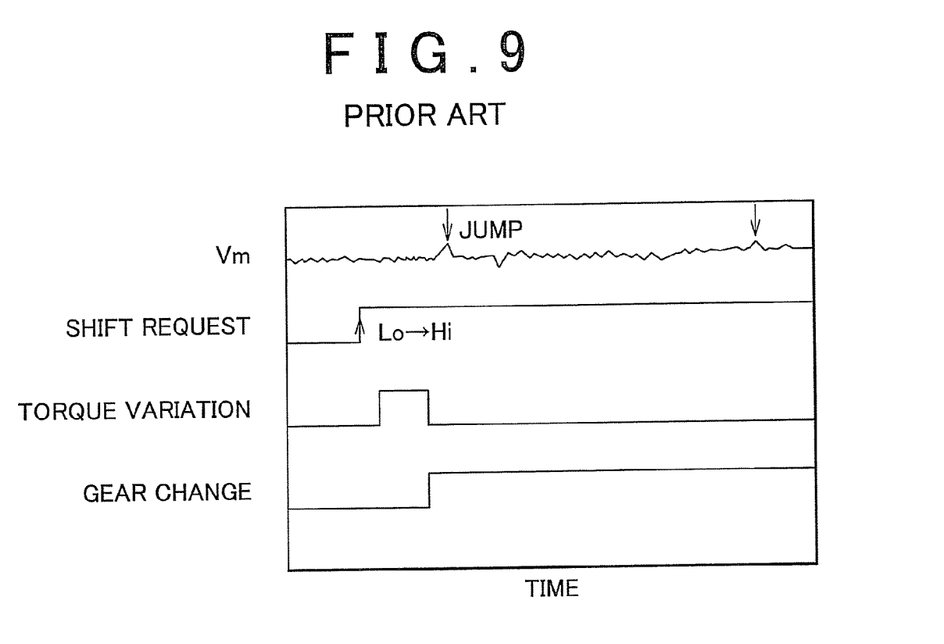
FIG. 9 is a graph that illustrates a state where a system voltage jumps at the time of a shift of a transmission according to an existing art.

FIG. 8 and FIG. 9 are graphs that show an example of states at the time of a shift of a transmission according to an existing art. FIG. 8 is a graph that shows a state in process of increasing motor rotational speed. Here, FIG. 8 shows that, because of the influence of a road surface, the motor rotational speed races, and, as the gear is changed, the rotational speed steeply reduces and the torque steeply reduces. As the motor rotational speed and the torque steeply reduce in this way, the electric power consumption of the rotary electric machine steeply reduces. The reduced amount of electric power consumption is regenerated to the smoothing capacitor of the inverter, and there is a possibility that the smoothing capacitor may be subjected to an overvoltage. FIG. 9 is a graph that shows a state where, because of a change of the gear, the system voltage Vm temporarily jumps to cause an overvoltage. In this way, there is a possibility that the system voltage Vm is excessive when the gear is changed.

Figure 10:
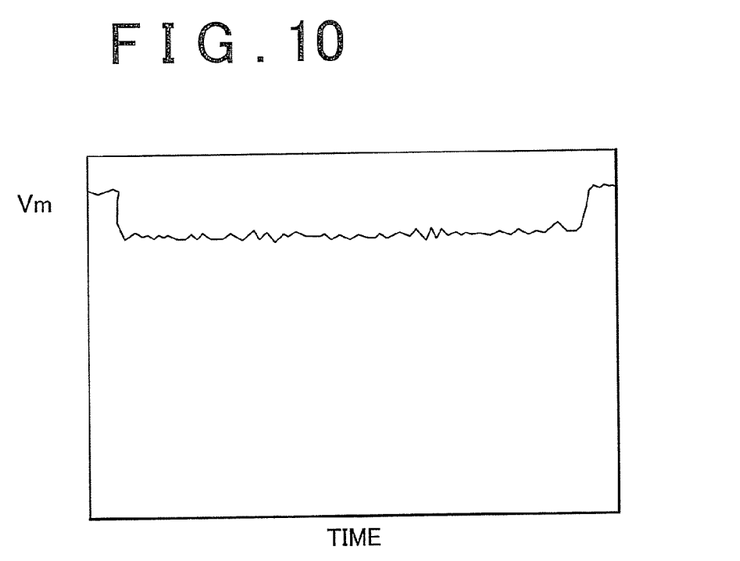
FIG. 10 is a graph that illustrates a state where a system voltage is reduced prior to a gear change according to the embodiment of the invention.

FIG. 10 is a graph that shows a state where the system voltage Vm is reduced prior to a change of the gear in order to prevent an overvoltage of an electrical component due to a jump of the system voltage Vm at the time of such a shift of the transmission. As shown in this graph, the system voltage Vm is temporarily reduced, and, after that, is returned to the original value again. This temporal reduction is carried out prior to a change of the gear, and the system voltage is returned to the original value at the time when the change of the gear is completed. Thus, it is possible to prevent an overvoltage of an electrical component due to a jump of the system voltage Vm in the existing art.

What is claimed is:

1. A vehicle control system comprising:
   a rotary electric machine that is connected to a drive shaft of a vehicle via a transmission;
   an inverter that operates on a system voltage that is stepped up or down by a converter and that drives the rotary electric machine; and
   a control unit that is programmed to acquire a shift state of the vehicle, that determines whether reduction of the system voltage is permitted on the basis of the acquired shift state, and that reduces the system voltage to a predetermined upper limit voltage when reduction of the system voltage is permitted.

2. The vehicle control system according to claim 1, wherein the control unit determines to permit reduction of the system voltage when the shift state of the vehicle cannot be acquired or when there is a shift request to the vehicle, and determines not to permit reduction of the system voltage when the vehicle is shifting gears or when there is no shift request to the vehicle.

3. The vehicle control system according to claim 2, wherein the control unit permits reduction of the system voltage when the vehicle is accelerating and there is a shift request for shifting the transmission from a low gear to a high gear or when the vehicle is decelerating and there is a shift request for shifting the transmission from the high gear to the low gear.

4. The vehicle control system according to claim 3, wherein the control unit is configured so that an amount by which the system voltage is reduced when the rotary electric machine is decelerated is larger than an amount by which the system voltage is reduced when the rotary electric machine is accelerated.

5. The vehicle control system according to claim 2, wherein the control unit reduces the system voltage to the predetermined upper limit voltage prior to a shift of the transmission when reduction of the system voltage is permitted because there is a shift request to the vehicle.

6. The vehicle control system according to claim 5, wherein the control unit outputs a torque variation command for the rotary electric machine in response to the shift request and, after that, a predetermined variation period of time later the control unit outputs a gear change command for the transmission.

7. The vehicle control system according to claim 6, wherein the control unit sets a predetermined rate of change for at least any variation in voltage of when the system voltage is reduced or when the system voltage is returned from a reduced state.

8. The vehicle control system according to claim 5, wherein the control unit returns the system voltage to a state before reduction after execution of a gear change command for the transmission is completed.

9. A vehicle control system comprising:
   a rotary electric machine that is connected to a drive shaft of a vehicle via a transmission;
   an inverter that operates on a system voltage that is stepped up or down by a converter and that drives the rotary electric machine; and
   a control unit that acquires a shift state of the vehicle, that determines whether reduction of the system voltage is permitted on the basis of the acquired shift state, and that reduces the system voltage to a predetermined upper limit voltage when reduction of the system voltage is permitted,
   wherein the control unit switches a control mode for driving the inverter among a sinusoidal-wave control mode, an overmodulation current control mode and a rectangular-wave voltage phase control mode, and varies the system voltage within a voltage range of an operating range of the same control mode between before and after variation of the system voltage.

10. A vehicle control system comprising:
    a rotary electric machine that is connected to a drive shaft of a vehicle via a transmission;
    an inverter that operates on a system voltage that is stepped up or down by a converter and that drives the rotary electric machine; and
    a control unit that is programmed to acquire a shift state of the vehicle, that determines whether reduction of the system voltage is permitted on the basis of the acquired shift state, and that reduces the system voltage to a predetermined upper limit voltage when reduction of the system voltage is permitted,
    wherein the control unit determines to permit reduction of the system voltage when the shift state of the vehicle cannot be acquired or when there is a shift request to the vehicle, and determines not to permit reduction of the system voltage when the vehicle is shifting gears or when there is no shift request to the vehicle.

* * * * *